(12) United States Patent
Russell

(10) Patent No.: US 8,033,388 B2
(45) Date of Patent: Oct. 11, 2011

(54) POWDER COATING COMPONENTS TO REDUCE FRICTION, INCREASE WEAR RESISTANCE, AND IMPROVE CLEANABILITY

(75) Inventor: Mark D. Russell, Goodlettsville, TN (US)

(73) Assignee: Span Tech LLC, Glasgow, KY (US)

( * ) Notice: Subject to any disclaimer, the term of this patent is extended or adjusted under 35 U.S.C. 154(b) by 226 days.

(21) Appl. No.: 12/296,020

(22) PCT Filed: Apr. 3, 2007

(86) PCT No.: PCT/US2007/065819
§ 371 (c)(1),
(2), (4) Date: Apr. 20, 2009

(87) PCT Pub. No.: WO2007/118058
PCT Pub. Date: Oct. 18, 2007

(65) Prior Publication Data
US 2009/0218199 A1    Sep. 3, 2009

Related U.S. Application Data

(60) Provisional application No. 60/788,650, filed on Apr. 3, 2006.

(51) Int. Cl.
*B65G 17/38* (2006.01)

(52) U.S. Cl. .......................... 198/850; 198/853

(58) Field of Classification Search .......... 198/850–853, 198/841, 860.1
See application file for complete search history.

(56) References Cited

U.S. PATENT DOCUMENTS

| | | |
|---|---|---|
| 3,648,825 A | 3/1972 | Burstein |
| 3,985,224 A | 10/1976 | Harvey |
| 4,024,605 A | 5/1977 | Henke |
| 4,195,887 A | 4/1980 | Ruddell |
| 4,266,660 A | 5/1981 | Herman |
| 4,722,689 A | 2/1988 | Corbett |
| 4,895,248 A | 1/1990 | Wahren |
| 5,048,675 A | 9/1991 | Nadalutti |
| 5,226,856 A | 7/1993 | Iacchetta et al. |
| 5,238,749 A | 8/1993 | Cueman et al. |
| 5,346,060 A | 9/1994 | Ferguson |

(Continued)

FOREIGN PATENT DOCUMENTS

EP    1 435 377    7/2004

(Continued)

OTHER PUBLICATIONS

User's Guide to Powder Coating, Third Edition, Society of Manufacturing Engineers, 1993, 113 pgs.

(Continued)

*Primary Examiner* — James R Bidwell
(74) *Attorney, Agent, or Firm* — King & Schickli, PLLC

(57) ABSTRACT

A component subjected to wear during use includes a powder coating formed of a polymer selected from the group consisting of a polyamide, polyolefin, polyester, urethane, epoxy, acrylic, and mixtures thereof to provide improved wear resistance, enhanced cleanability, and reduced surface friction. Preferably, the component is for use in conveying product, such as in a conveyor system, and includes: (1) a metal core and a nylon powder coating; or (2) a stainless steel core and a powder coating. Most preferably, the coating is generally clear or translucent so as to give the appearance that the underlying component, which is typically made of metal, is neither coated nor made entirely of a polymer.

24 Claims, 11 Drawing Sheets

U.S. PATENT DOCUMENTS

| | | | |
|---|---|---|---|
| 5,549,193 A | 8/1996 | Schlueter, Jr. et al. |
| 5,562,200 A | 10/1996 | Daringer |
| 5,579,898 A | 12/1996 | Nakagawa et al. |
| 5,775,480 A | 7/1998 | Lapeyre et al. |
| 5,829,954 A | 11/1998 | Pruett |
| 5,954,190 A | 9/1999 | Takahashi et al. |
| 6,039,964 A | 3/2000 | Sanduja et al. |
| 6,164,439 A | 12/2000 | Stebnicki et al. |
| 6,247,582 B1 | 6/2001 | Stebnicki et al. |
| 6,280,798 B1 | 8/2001 | Ring et al. |
| 6,360,881 B2 | 3/2002 | Stebnicki et al. |
| 6,398,002 B1 | 6/2002 | Choquette et al. |
| 6,467,610 B1 | 10/2002 | MacLachlan |
| 6,471,033 B2 | 10/2002 | Ulrich |
| 6,494,312 B2 | 12/2002 | Costanzo |
| 6,506,455 B1 | 1/2003 | Bru et al. |
| 6,525,137 B1 | 2/2003 | Alex et al. |
| 6,561,344 B1 | 5/2003 | Basse |
| 6,578,704 B1 | 6/2003 | MacLachlan |
| 6,601,698 B2 | 8/2003 | Jakob |
| 6,648,129 B2 | 11/2003 | Sedlacek |
| 6,666,328 B2 | 12/2003 | Sykora |
| 6,687,961 B2 | 2/2004 | Miller et al. |
| 6,695,134 B2 | 2/2004 | Rubino et al. |
| 6,695,135 B1 | 2/2004 | Lapeyre |
| 6,758,323 B2 | 7/2004 | Costanzo |
| 6,820,738 B2 | 11/2004 | Hara et al. |
| 6,948,612 B2 | 9/2005 | Kobayashi et al. |
| 6,968,943 B2 | 11/2005 | Kilby et al. |
| 6,986,420 B2 | 1/2006 | Weiser et al. |
| 6,991,094 B2 | 1/2006 | Frost |
| 6,994,209 B2 | 2/2006 | Cediel et al. |
| 6,994,210 B2 | 2/2006 | Kerwel et al. |
| 6,997,309 B2 | 2/2006 | Stebnicki et al. |
| 7,008,229 B2 | 3/2006 | Stoller et al. |
| 7,207,436 B1 * | 4/2007 | Houghton ............ 198/860.1 |
| 2002/0172829 A1 | 11/2002 | Mori et al. |
| 2003/0075420 A1 | 4/2003 | Larkins |
| 2004/0191555 A1 | 9/2004 | Germano |
| 2005/0023113 A1 | 2/2005 | Karnes |
| 2005/0061636 A1 | 3/2005 | Frost et al. |
| 2005/0061637 A1 | 3/2005 | Kilby et al. |
| 2005/0183936 A1 | 8/2005 | Neely et al. |
| 2006/0054471 A1 | 3/2006 | Maeda |

FOREIGN PATENT DOCUMENTS

| | | |
|---|---|---|
| GB | 1 168 030 | 10/1969 |
| WO | WO 00/55268 A2 | 9/2000 |
| WO | WO 2007/028102 A2 | 3/2007 |

OTHER PUBLICATIONS

Thermoplastic Polyamide 11 Powder, Case Files, Automotive, Version 2, Feb. 2002, Slide No. 29/49, 15 pgs.

* cited by examiner

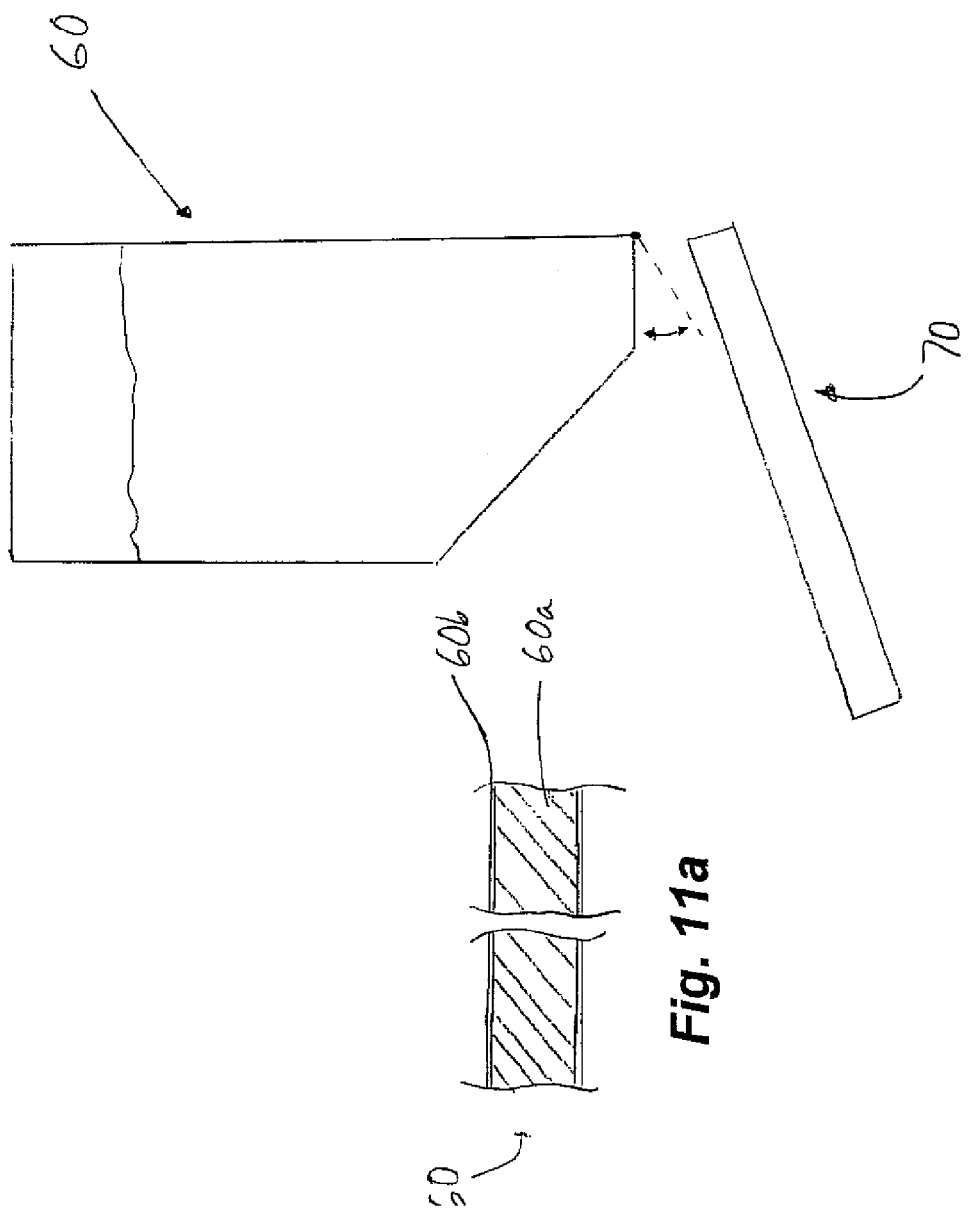

Abrasion Test 1

Before Test

| | Diameters of Chain Rods | | | | | |
|---|---|---|---|---|---|---|
| | Perpendicular to Center of Shaft | | | Tangent to Center of Shaft | | |
| | Top | Center | Bottom | Top | Center | Bottom |
| Stainless Steel 1 | 3.96 | 3.96 | 3.97 | 3.98 | 3.97 | 3.98 |
| Furniture White | 4.13 | 4.11 | 4.07 | 4.11 | 4.12 | 4.08 |
| Stainless Steel 2 | 4 | 3.98 | 3.97 | 3.97 | 3.97 | 3.97 |
| Antique White | 4.12 | 4.12 | 4.18 | 4.12 | 4.11 | 4.15 |
| White Water | 4.1 | 4.09 | 4.1 | 4.08 | 4.08 | 4.11 |
| Duralon 12 | 4.34 | 4.22 | 4.21 | 4.2 | 4.17 | 4.16 |

After Test

| | Diameters of Chain Rods | | | | | |
|---|---|---|---|---|---|---|
| | Perpendicular to Center of Shaft | | | Tangent to Center of Shaft | | |
| | Top | Center | Bottom | Top | Center | Bottom |
| Stainless Steel 1 | 3.98 | 3.99 | 3.97 | 3.97 | 3.97 | 3.97 |
| Furniture White | 4.14 | 4.14 | 4.06 | 4.07 | 4.03 | 4.04 |
| Stainless Steel 2 | 4.02 | 4.03 | 3.97 | 3.97 | 3.97 | 3.97 |
| Antique White | 4.13 | 4.11 | 4.15 | 4.1 | 4.03 | 4.11 |
| White Water | 4.09 | 4.07 | 4.1 | 4.05 | 4.01 | 4.09 |
| Duralon 12 | 4.32 | 4.23 | 4.21 | 4.19 | 4.16 | 4.16 |

After Test — Total Change in Diameters of Chain Rods

Rotating @ 900 RPM in Sand Bath (Run Time: 1 hr. 27 min.)

| | Perpendicular to Center of Shaft | | | Tangent to Center of Shaft | | |
|---|---|---|---|---|---|---|
| | Top | Center | Bottom | Top | Center | Bottom |
| Stainless Steel 1 | 0.02 | 0.03 | 0 | -0.01 | 0 | -0.01 |
| Furniture White | 0.01 | 0.03 | -0.01 | -0.04 | -0.09 | -0.04 |
| Stainless Steel 2 | 0.02 | 0.05 | 0 | 0 | 0 | 0 |
| Antique White | 0.01 | -0.01 | -0.03 | -0.02 | -0.08 | -0.04 |
| White Water | -0.01 | -0.02 | 0 | -0.03 | -0.07 | -0.02 |
| Duralon 12 | -0.02 | 0.01 | 0 | -0.01 | -0.01 | 0 |

Total Diameter Loss

| | | |
|---|---|---|
| Stainless Steel 1 | 0.03 | mm |
| Furniture White | -0.14 | mm |
| Stainless Steel 2 | 0.07 | mm |
| Antique White | -0.17 | mm |
| White Water | -0.15 | mm |
| Duralon 12 | -0.03 | mm |

| Abrasion Test 2 ||||||||
| --- |||||||| 
| Diameters of Chain Rods(mm) ||||||||
| Before Test | Perpendicular to Center of Shaft ||| Tangent to Center of Shaft |||
| | Top | Center | Bottom | Top | Center | Bottom |
| Duralon 12 (1) | 4.12 | 4.18 | 4.18 | 4.18 | 4.22 | 4.21 |
| Stainless Steel 1 | 3.98 | 3.98 | 3.97 | 3.96 | 3.97 | 3.96 |
| Stainless Steel 2 | 3.97 | 3.97 | 3.98 | 3.97 | 3.97 | 3.97 |
| Duralon 12 (2) | 4.18 | 4.22 | 4.19 | 4.17 | 4.2 | 4.17 |
| Stainless Steel 3 | 3.98 | 3.97 | 3.98 | 3.97 | 3.97 | 3.97 |
| Stainless Steel 4 | 3.97 | 3.97 | 3.97 | 3.97 | 3.97 | 3.97 |

| Diameters of Chain Rods(mm) (Run Time: 2 hr. 24 min.) ||||||||
| --- ||||||||
| After Time 1 | Perpendicular to Center of Shaft ||| Tangent to Center of Shaft |||
| | Top | Center | Bottom | Top | Center | Bottom |
| Duralon 12 (1) | 4.11 | 4.2 | 4.18 | 4.16 | 4.2 | 4.18 |
| Stainless Steel 1 | 3.97 | 3.97 | 3.96 | 3.96 | 3.95 | 3.95 |
| Stainless Steel 2 | 3.97 | 3.96 | 3.96 | 3.94 | 3.94 | 3.94 |
| Duralon 12 (2) | 4.18 | 4.21 | 4.19 | 4.14 | 4.19 | 4.13 |
| Stainless Steel 3 | 3.96 | 3.96 | 3.96 | 3.94 | 3.94 | 3.93 |
| Stainless Steel 4 | 3.97 | 3.96 | 3.96 | 3.94 | 3.93 | 3.92 |

| Diameters of Chain Rods(mm) (Run Time: 2 hr. 33 min.) ||||||||
| --- ||||||||
| After Time 1 | Perpendicular to Center of Shaft ||| Tangent to Center of Shaft |||
| | Top | Center | Bottom | Top | Center | Bottom |
| Duralon 12 (1) | 4.11 | 4.17 | 4.18 | 4.15 | 4.19 | 4.16 |
| Stainless Steel 1 | 3.97 | 3.97 | 3.96 | 3.94 | 3.94 | 3.93 |
| Stainless Steel 2 | 3.97 | 3.96 | 3.97 | 3.92 | 3.93 | 3.93 |
| Duralon 12 (2) | 4.18 | 4.21 | 4.19 | 4.13 | 4.16 | 4.12 |
| Stainless Steel 3 | 3.96 | 3.96 | 3.96 | 3.92 | 3.92 | 3.91 |
| Stainless Steel 4 | 3.97 | 3.96 | 3.96 | 3.92 | 3.91 | 3.9 |

| Diameters of Chain Rods(mm) (Run Time: 3 hr. 38 min.) ||||||||
| --- ||||||||
| After Time 1 | Perpendicular to Center of Shaft ||| Tangent to Center of Shaft |||
| | Top | Center | Bottom | Top | Center | Bottom |
| Duralon 12 (1) | 4.1 | 4.15 | 4.16 | 4.13 | 4.18 | 4.13 |
| Stainless Steel 1 | 3.96 | 3.95 | 3.97 | 3.91 | 3.91 | 3.9 |
| Stainless Steel 2 | 3.97 | 3.97 | 3.96 | 3.91 | 3.9 | 3.9 |
| Duralon 12 (2) | 4.17 | 4.2 | 4.18 | 4.1 | 4.15 | 4.07 |
| Stainless Steel 3 | 3.96 | 3.96 | 3.97 | 3.89 | 3.89 | 3.86 |
| Stainless Steel 4 | 3.96 | 3.95 | 3.96 | 3.89 | 3.89 | 3.87 |

| Rotating @ 900 RPM in Sand Bath ||||||||
| --- ||||||||
| Total Change in Diameters of Chain Rods(mm) (Run Time: 8 hr. 35 min.) ||||||||
| After Test | Perpendicular to Center of Shaft ||| Tangent to Center of Shaft |||
| | Top | Center | Bottom | Top | Center | Bottom |
| Duralon 12 (1) | -0.02 | -0.03 | -0.02 | -0.05 | -0.04 | -0.08 |
| Stainless Steel 1 | -0.02 | -0.03 | 0 | -0.05 | -0.06 | -0.06 |
| Stainless Steel 2 | 0 | 0 | -0.02 | -0.05 | -0.07 | -0.07 |
| Duralon 12 (2) | -0.01 | -0.02 | -0.01 | -0.07 | -0.05 | -0.1 |
| Stainless Steel 3 | -0.02 | -0.01 | -0.01 | -0.08 | -0.08 | -0.11 |
| Stainless Steel 4 | -0.01 | -0.02 | -0.01 | -0.08 | -0.08 | -0.1 |

| Total Diameter Loss || Distance From Outside of Shaft to Inside of Rod ||
| --- | --- | --- | --- |
| Duralon 12 (1) | -0.24 | mm | 53.29 | mm |
| Stainless Steel 1 | -0.22 | mm | 52.7 | mm |
| Stainless Steel 2 | -0.22 | mm | 52.58 | mm |
| Duralon 12 (2) | -0.26 | mm | 52.62 | mm |
| Stainless Steel 3 | -0.31 | mm | 53.34 | mm |
| Stainless Steel 4 | -0.3 | mm | 53.59 | mm |

Fig. 18

| Abrasion Test 3 | | | | | | |
|---|---|---|---|---|---|---|
| Diameters of Chain Rods(mm) | | | | | | |
| Before Test | Perpendicular to Center of Shaft | | | Tangent to Center of Shaft | | |
| | Top | Center | Bottom | Top | Center | Bottom |
| Duralon 12 (1) | 4.21 | 4.17 | 4.12 | 4.18 | 4.14 | 4.12 |
| Duralon 12 (2) | 4.32 | 4.31 | 4.25 | 4.39 | 4.36 | 4.33 |
| Clear (1) | 4.02 | 3.98 | 4.04 | 4.09 | 4.08 | 4.07 |
| Clear (2) | 3.99 | 4.05 | 4.07 | 3.94 | 4.05 | 4.04 |
| Stainless Steel (1) | 3.97 | 3.97 | 3.98 | 3.96 | 3.96 | 3.96 |
| Stainless Steel (2) | 3.96 | 3.97 | 3.97 | 3.96 | 3.97 | 3.96 |

| Diameters of Chain Rods(mm) (Run Time: 7 hr. 5 min.) | | | | | | |
|---|---|---|---|---|---|---|
| After Time 1 | Perpendicular to Center of Shaft | | | Tangent to Center of Shaft | | |
| | Top | Center | Bottom | Top | Center | Bottom |
| Duralon 12 (1) | 4.2 | 3.97 | 3.98 | 4.12 | 3.96 | 3.95 |
| Duralon 12 (2) | 4.32 | 4.32 | 4.25 | 4.34 | 4.3 | 4.25 |
| Clear (1) | 4 | 3.98 | 4.03 | 4.05 | 4.02 | 3.97 |
| Clear (2) | 3.99 | 4.03 | 3.93 | 3.94 | 3.98 | 3.92 |
| Stainless Steel (1) | 3.96 | 3.96 | 3.96 | 3.91 | 3.9 | 3.87 |
| Stainless Steel (2) | 3.96 | 3.95 | 3.95 | 3.89 | 3.88 | 3.87 |

| Rotating @ 900 RPM in Sand Bath | | | | | | |
|---|---|---|---|---|---|---|
| Total Change in Diameters of Chain Rods(mm) (Run Time: 7hr. 5min.) | | | | | | |
| After Test | Perpendicular to Center of Shaft | | | Tangent to Center of Shaft | | |
| | Top | Center | Bottom | Top | Center | Bottom |
| Duralon 12 (1) | -0.01 | -0.2 | -0.14 | -0.06 | -0.18 | -0.17 |
| Duralon 12 (2) | 0 | 0.01 | 0 | -0.05 | -0.06 | -0.08 |
| Clear (1) | -0.02 | 0 | -0.01 | -0.04 | -0.06 | -0.1 |
| Clear (2) | 0 | -0.02 | -0.14 | 0 | -0.07 | -0.12 |
| Stainless Steel (1) | -0.01 | -0.01 | -0.02 | -0.05 | -0.06 | -0.09 |
| Stainless Steel (2) | 0 | -0.02 | -0.02 | -0.07 | -0.09 | -0.09 |

| Total Diameter Loss | | | Distance From Outside of Shaft to Inside | |
|---|---|---|---|---|
| Duralon 12 (1) | -0.76 | mm | 53.29 | mm |
| Duralon 12 (2) | -0.18 | mm | 52.7 | mm |
| Clear (1) | -0.23 | mm | 52.58 | mm |
| Clear (2) | -0.35 | mm | 52.62 | mm |
| Stainless Steel (1) | -0.24 | mm | 53.34 | mm |
| Stainless Steel (2) | -0.29 | mm | 53.59 | mm |

POWDER COATING COMPONENTS TO REDUCE FRICTION, INCREASE WEAR RESISTANCE, AND IMPROVE CLEANABILITY

This application claims the benefit of U.S. Provisional Patent Application Ser. No. 60/788,650, filed Apr. 3, 2006, the disclosure of which is incorporated herein by reference.

TECHNICAL FIELD

This invention relates generally to the tribological arts and, more particularly, to wear-resistant, easily cleanable powder coated components with low friction surfaces, especially for use in conveying product.

BACKGROUND OF THE INVENTION

The use of metal, such as steel, in forming wear components is ubiquitous. To provide steel components with enhanced surface properties and wear resistance, one very popular technique is to alter the composition of the steel alloy during fabrication to provide an outer surface with high corrosion resistance. Besides being resistant to troublesome corrosion and staining, this "stainless" steel as it is commonly known provides low maintenance and is relatively inexpensive to fabricate, which makes it an ideal base material for a host of commercial applications. In particular, stainless steel can be worked into components, such as sheets, plates, bars, wire, and tubing to be used in cookware, cutlery, hardware, surgical instruments, major appliances, industrial equipment (such as for conveying products), and even building material in skyscrapers and large buildings.

While users of stainless steel benefit from the concomitant advantages described above, this material is not without limitations, especially when used in industrial applications involving the processing of organic materials. For one, stainless steel can have a relatively high coefficient of friction with many other materials, including plastics (such as acetal) and other metals. Thus, stainless steel is generally not used in environments where it is subjected to constant or frequent sliding contact with another part, since the resulting high friction creates undesirable wear and may quickly degrade the desirable corrosion-resistant surface.

Wearing of stainless steel over time also tends to produce what is known in the vernacular as "black oxide." This black oxide is believed to emanate from the surface of the stainless steel as the result of abrasion. Although generally believed to be harmless, this black oxide is unsightly, difficult to remove using standard cleaning techniques, and leads users of the components to believe that the affected components must be replaced to ameliorate the problem. While offering a temporary improvement, replacing the components before the end of their normal service life is an expensive undertaking and merely delays the onset of a relapse of the problem.

For reasons not well identified, the typical surface properties of common types of stainless steel also cause certain materials, and especially those with a relatively high fat (oil) content, to tend to adhere and resist being released during cleaning. For example, stainless steel is often used for conveying, such as through chutes, dispensers, chains, belts, or like components. Typically, these conveyor components must be washed frequently and thoroughly in order to ensure that a clean environment is maintained and contamination kept in close check, especially when products for human consumption are involved (primarily, because of strict FDA regulations).

Despite offering superior corrosion resistance, the property of stainless steel that allows certain materials to adhere to it makes it more difficult and expensive to wash thoroughly. Indeed, washing may take up to one third of the service life of the component, which obviously contributes significantly to the operational cost. Besides being costly, frequent washing also generates a significant amount of waste product requiring further treatment or disposal, which raises environmental considerations. Washing is also typically done using chlorine, which as is well known can easily degrade stainless steel over time, and even lead to deleterious rusting.

Accordingly, a need is identified for an improved manner of making metals and, in particular, stainless steel, into components usable in situations where they are subject to sliding friction and concomitant wear, or where cleanability is of paramount importance, such as in food and chemical processing. No significant increase in manufacturing expense would result, yet a significant benefit in terms of service life and cleanability would be realized. Furthermore, the technique would be such that it could be used not only in manufacturing new components, but also on existing components in order to extend their service life and improve cleanability.

SUMMARY OF THE INVENTION

In accordance with a first aspect of the invention, a conveyor component is provided for use in a conveying system for supporting or conveying product with improved wear resistance, enhanced cleanability, and reduced surface friction. The component comprises an electrically conductive substrate having a surface coated with a shell comprising a generally clear or translucent powder coating formed of a polymer selected from the group consisting of a polyamide, polyolefin, polyester, urethane, epoxy, acrylic, and mixtures thereof. As a result, the shell is essentially invisible to the naked eye.

Preferably, the substrate comprises metal and, most preferably, stainless steel. The coating preferably comprises a polyamide and, most preferably nylon. The substrate may take the form of a plate, link, bar, rod, or wire mesh.

In accordance with another aspect of the invention, an improved link is provided for supporting the product being conveyed. The link has an electrically conductive core and a powder coating formed of a polymer creating a shell on a surface of the core. The polymer is selected from the group consisting of a polyamide, a polyolefin, a polyester, a urethane, an epoxy, an acrylic, and mixtures thereof.

Preferably, the shell comprises a polyamide and, most preferably, nylon. The shell may be opaque or generally clear (translucent or transparent), and may further include an anti-microbial, anti-bacterial, anti-fungal, or germicidal agent. The shell may be relatively thin, having a thickness of about 0.003 to 0.005 inches. Preferably, the core is steel and, most preferably, stainless steel.

In accordance with yet another aspect of the invention, a conveyor system comprises a plurality of interconnected links forming a chain for conveying product and a support for supporting the chain. One of the links or the support comprises an electrically conductive core having a surface powder coated with a polymer to form an outer shell. Preferably, the links are interconnected by connectors, at least one of which comprises an electrically conductive core having a surface powder coated with a polymer to form an outer shell. The links may also be intermeshed.

In accordance with still a further aspect of the invention, a conveyor system comprises a plurality of links and at least one connector for interconnecting the links. At least one of the links comprises an electrically conductive core having a surface powder coated with a polymer to form an outer shell.

Yet another aspect of the invention is a conveyor system for conveying product. The system comprises a plurality of interconnected links forming a chain and a sprocket for engaging the chain. One of the links or the sprocket comprises an electrically conductive core having a surface powder coated with a polymer to form an outer shell.

Still a further aspect of the invention is a method of improving wear resistance, enhancing cleanability, and reducing surface friction in a conveyor system. The method comprises the steps of powder coating a steel component of the conveyor system using a polymer selected from the group consisting of a polyamide, polyolefin, polyester, urethane, epoxy, acrylic, and mixtures thereof. The method further comprises the step of using the powder coated steel component to hold or convey product.

Preferably, the powder coating step comprises at least partially coating the electrically conductive core with the polymer powder. The coating is then heated to form a protective shell on a surface of the steel component. Preferably, the method comprises electrostatically applying nylon powder to a surface of the steel and then heating the component to cure the powder and form the shell.

Still a further aspect of the invention is a method of conveying product by way of a stationary wear surface in a more efficient manner, including as a result of the enhanced cleanability, reduced surface friction, and improved wear resistance of the wear surface. The method comprises powder coating the stationary wear surface with a polymer and using the stationary wear surface to hold or convey the product. The polymer is selected from the group consisting of polyamides, polyolefins, polyesters, urethanes, epoxies, acrylics, and mixtures thereof.

Preferably, the wear surface is a surface on an electrically conductive link of a conveyor chain, and the powder coating step comprises electrostatically applying a polymer powder to the surface and then heating the component to cure the powder and form a protective shell. The wear surface may be formed on various structures. For example, when the wear surface is formed on a chute, the powder coating step comprises electrostatically applying a polymer powder to a surface of the chute and then heating the component to cure the powder and form a protective shell. When the wear surface is formed on a dispenser, the powder coating step comprises electrostatically applying a polymer powder to a surface of the dispenser and then heating the component to cure the powder and form a protective shell. In any case, the method may further include the step of cleaning the wear surface.

BRIEF DESCRIPTION OF THE DRAWINGS

FIG. 11 is a schematic side view of a hopper and chute that may be powder coated;

FIG. 11a is a cross-sectional view of the hopper of FIG. 11;

FIG. 12 is a cross-sectional view of the chute of FIG. 11;

FIG. 13 is another example of a powder-coated conveyor component;

FIG. 13a is a cross-sectional view of the component of FIG. 13a;

FIG. 14a is a cross-sectional view of the component of FIG. 14a;

FIGS. 16-18 present tables illustrating numerically the result of various experiments conducted to demonstrate the potential efficacy of the inventive aspects disclosed.

DETAILED DESCRIPTION OF THE INVENTION

Figure 1:
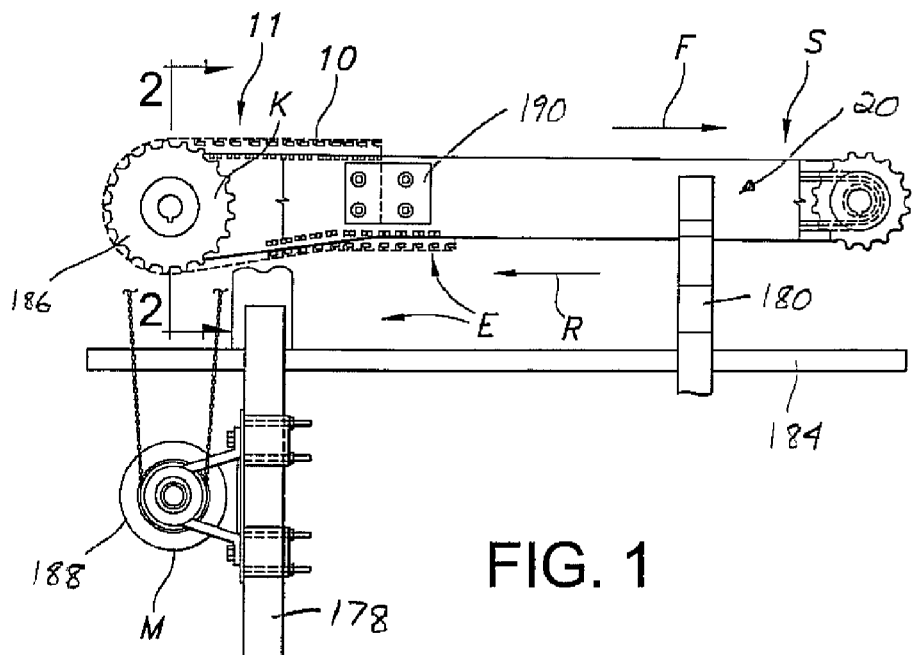
FIG. 1 is a partially cutaway side elevational view of a conveyor system with which the present invention may have utility.
Figure 2:
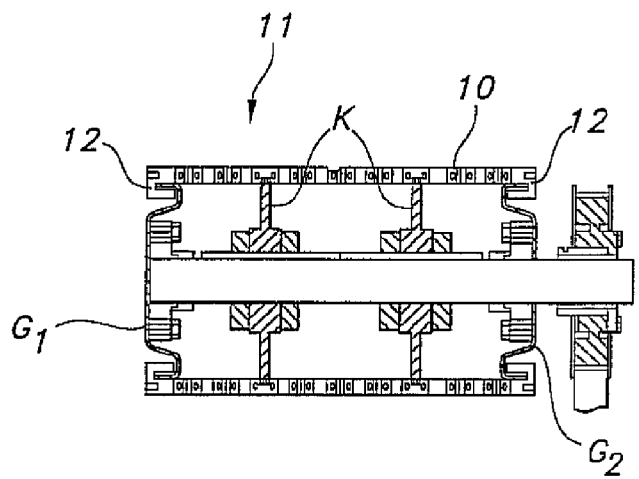
FIG. 2 is a cross-sectional view taken along line 2-2 of FIG. 1.
Figure 3:
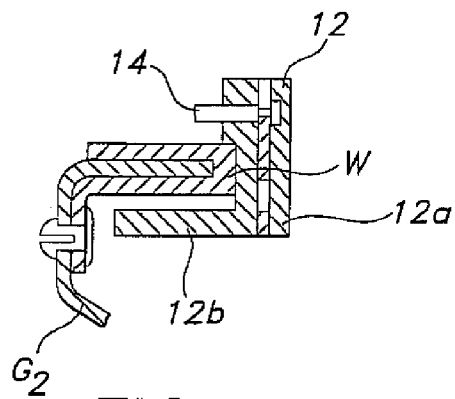
FIG. 3 is a cross-sectional, enlarged view of the wear arrangement for the conveyor chain or belt shown in FIG. 2.
Figure 6:
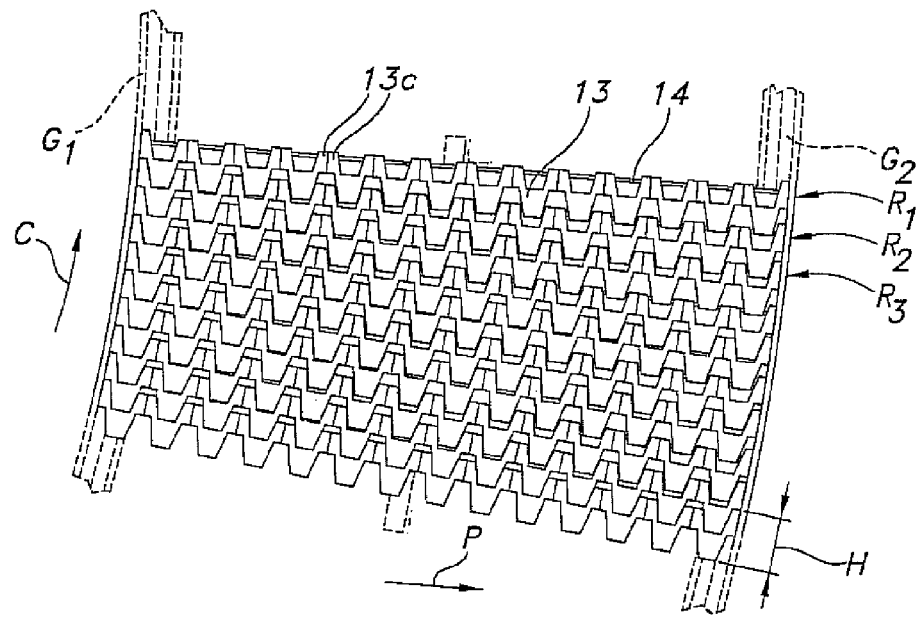
FIG. 6 is a top view of the conveyor system as shown in FIG. 1 but arranged to continuously curve.

Reference is now made to FIGS. 1 and 2, which depict one possible environment in which the various disclosed aspects of the present invention may have utility. These figures depict an overall conventional arrangement of a conveyor system S including a belt or chain 10. The chain 10 includes a wear surface, such as conveying surface 11, for engaging and supporting articles. In this particular embodiment, the chain 10 comprises or includes modular links including side guide links 12 and intermediate links 13 arranged in spaced apart rows (see FIG. 6 and note rows $R_1 \ldots R_n$), which thus partially create the conveying surface 11. Adjacent rows $R_1$, $R_2$ of links are interconnected by transversely extending connectors 14.

With regard to the side links 12, and as perhaps best understood by viewing FIGS. 3 and 4a-4c, each may include an outer depending arm 12a and an inwardly projecting or extending transverse tab 12b (thus creating different right handed or left handed side links, depending on the particular positioning). When present, the depending arm 12a and transverse tab 12b are designed to receive a conventional support structure, which may include a longitudinally extending guide rail $G_1$, $G_2$ forming part of the conveyor support frame E (see FIGS. 2 and 5). These guide rails $G_1$, $G_2$ support the chain 10 along both the forward run F and the return run R as it is bidirectionally driven in an endless path (such as by spaced sprockets K adapted for engaging the links along a transition from a forward run F to a return run R and gang-driven by an associated motor M).

Figure 5:
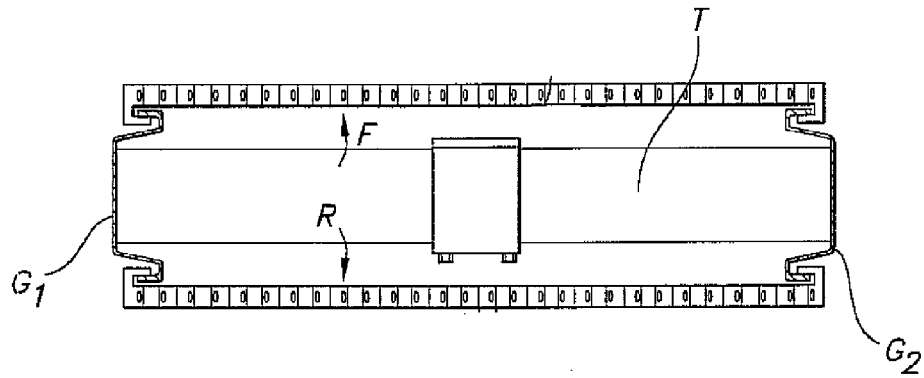
FIG. 5 is a partially cross-sectional side view similar to FIG. 2.

Each guide rail $G_1$ or $G_2$ preferably includes a wear strip W formed of a tribologically enhanced material to provide reduced friction contact with the links 12. The guide rails $G_1$ or $G_2$ may be C-shaped or sigma shaped, as shown in FIGS. 2 and 5, or instead may simply include one or more support sections of any desired shape carrying the associated wear strips W such that they project outwardly therefrom like a tongue or tenon and thus define a bearing surface for the chain 10 (and, in particular, the side guide links 12). Associated links of the sort mentioned are typically formed of complementary or matched materials, such as acetal or other inexpensive, lightweight, and durable materials using well-known forming techniques (including possibly co-molding of different materials). Although performance of the system 10 may be improved as a result, matching of the materials forming the links and guide rails (wear strips) is not considered a requirement.

Preferably, pairs of side links 12 together with intermediate links 13 form rows spaced apart in the direction in which the chain 10 is typically driven (referred to as the longitudinal direction or the conveying direction (note action arrow D in the plan view of FIG. 6), since it corresponds to the main direction in which articles are conveyed by the chain 10 during normal operation, as opposed to the transverse or lateral direction P). To interconnect the pairs of links 12 forming a first (leading) row $R_1$, the transverse connector 14 takes the form of a stainless steel rod passing through aligned holes (see FIG. 6) formed in foot portions 13c of each intermediate link 13 (which may be more than two in cases where each link has plural laterally repeating sections), including the side link 12. During construction of the chain 10, the links 12, 13 of a second, adjacent (trailing) row $R_2$ interdigitate with those of the first row $R_1$, with the connector 14 passing through a slot 12d elongated in the conveying direction D and formed in the apex 12e of each link 12, 13 in the second row (and thereby forming a section of the chain 10).

As should be appreciated by those of skill in the art, this specific structural arrangement (which is considered entirely optional for purposes of the present invention in its broadest aspects) allows for the chain 10 to side-flex to negotiate curves or bends (see FIG. 6), as well as to compress or expand in the longitudinal direction, and thus eliminates the need for a catenary. If such enhanced functionality is not necessary for a particular application, the slots 12e could simply be replaced with plain holes for receiving the connector 14, which would create a non-side flexing, non-longitudinally compressible chain.

Figures 4A, 4B, 4C:
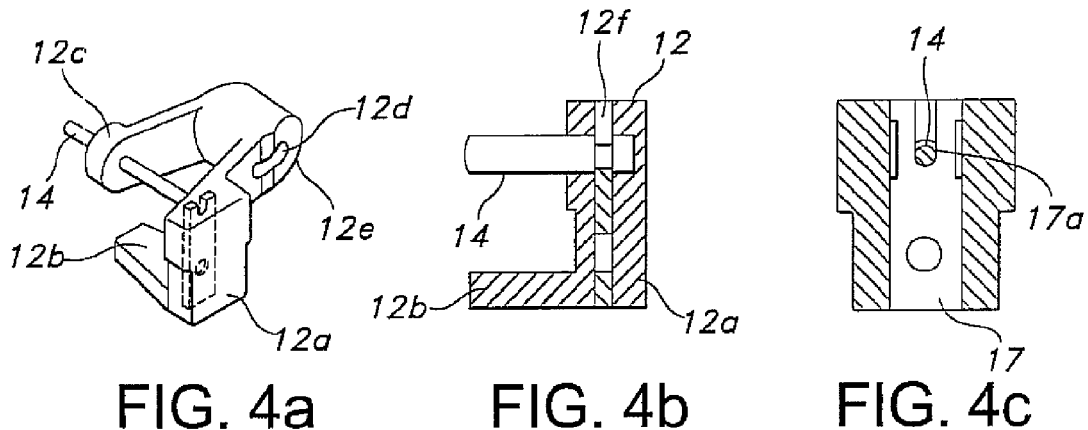
FIGS. 4a, 4b, and 4c are various view of a side link arrangement for the conveyor chain or belt shown in FIG. 2.

The connector 14 may be retained in place by a retainer 16. In the illustrated embodiment, the retainer 16 is in the form of a tab 17 removably inserted in a receiver 12f or slot formed in each side link 12. As shown in FIG. 4c, the tab 17 may include a recess 17a for engaging a necked or recessed portion 14a of the connector 14. This pattern of assembly may be repeated among the interdigitated links 12, 13 as necessary to form a chain 10 having a particular length in the conveying direction. A full description of this type of chain or "belt" as it is sometimes called in the vernacular, is found in the commonly assigned U.S. Pat. Nos. 4,953,693 and 5,031,757, the disclosures of which are fully incorporated herein by reference.

Figure 7:
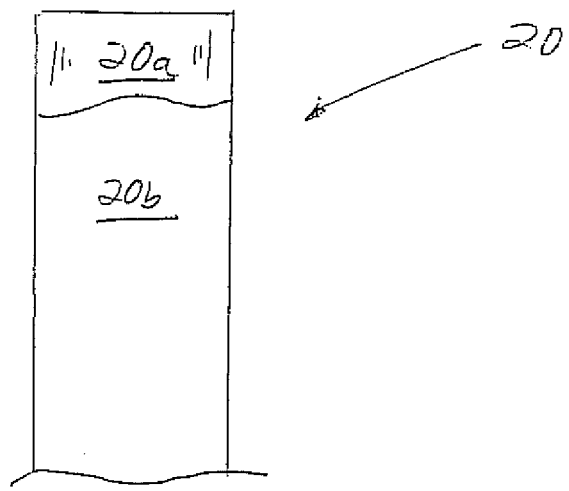
FIG. 7 is an enlarged schematic view of a powder coated connector rod.

As shown in FIG. 7, one aspect of the present invention is providing a typical electrically conductive (which as used herein means at least conductive enough to undergo processing via powder coating) wear component of the conveyor system S, such as a frame component 20 for supporting the chain 10 (see FIG. 1), with an outer coating formed of a wear resistant polymer material, as outlined in more detail in the following description. Specifically, this frame component 20 is preferably formed of a rigid metal core 20a, such as one made of mild or stainless steel (e.g., 303 or 304), and having a surface coated to create an outer film or shell 20b. This shell 20b may be comprised of durable, wear and abrasion resistant thermoset or thermoplastic polymer material, such as a polyamide, a polyester, a polyolefin, a urethane, an epoxy, an acrylic, or mixtures thereof (but generally excluding polytetrafluoroethylene (PTFE), or Teflon, which when applied as a coating, cannot handle the resulting wear to a degree acceptable for resolving the above-identified problems). In one particularly preferred embodiment, the shell 20b comprises Nylon 11 or Nylon 12, versions of which are sold in powder form under the trademark DURALON by the Thermoclad Company of Erie, Pa.

The coating forming the shell 20b is most preferably applied to the core 20a by a powder coating process. Such process involves using an electrostatic delivery device (e.g., a gun), fluidized bed to deliver the chosen powder to the entire outer surface of the core 20a, or like delivery means. The powder is then baked at a relatively high temperature (e.g., greater than 400° F. but generally less than 500° F.) for a certain time period (e.g., greater than 15 minutes). This balking may cure, or "set" the powder and form the outer coating (e.g., the shell 20b). Typically, the coating is of a thickness of about 0.003 to 0.005 inches, which may vary depending on the needs of a particular situation or the application technique used.

Figure 8:
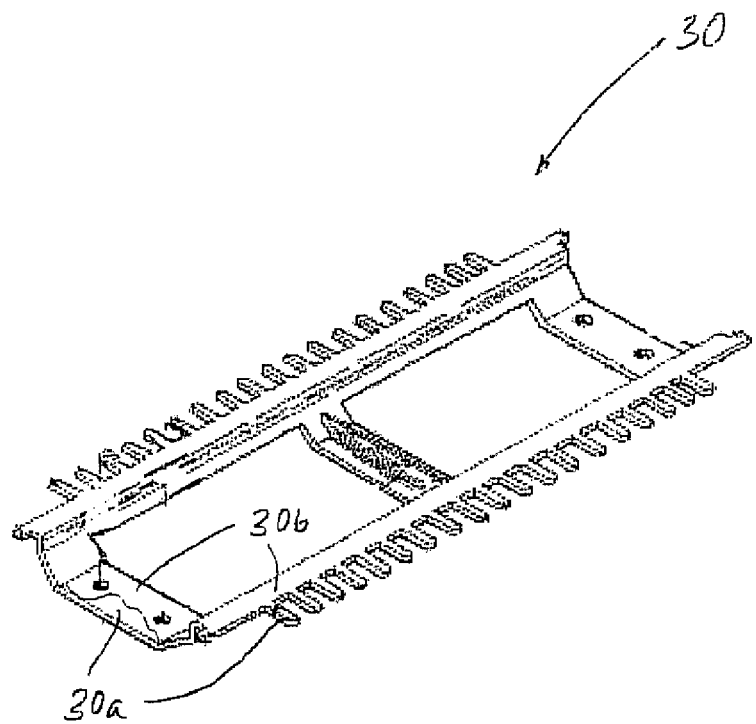
FIG. 8 is a perspective view of a powder coated bed for a transfer conveyor.

As shown in FIG. 8, another aspect of the present invention is providing a typical stainless steel component of the conveyor system, such as a transfer bed 30 (see U.S. Pat. Nos. 5,584,373 and 5,749,454, the disclosures of which are incorporated herein by reference), with a clear or colorless powder coating. Specifically, this bed 30 is preferably formed of a rigid core 30a made of stainless steel (e.g., 303 or 304), and coated with an outer film or shell 30b comprised of durable, wear and abrasion resistant polymer material. in the case of a metal core, the clear or colorless nature of the shell 30b used gives the appearance that the article is made of durable material, despite the coating and the enhanced level of protection afforded by it.

Preferably, the shell 30b comprises nylon, and most preferably Nylon 11 or Nylon 12. However, the coating for the core 30a may comprise other durable, abrasion-resistant materials, with a preference for hydrocarbon-based polymers including a polyester, a polyamide, a polyolefin, a urethane, an acrylic, an epoxy, or other powder coat paints. Mixtures of these polymer powder coatings may also be used to advantage.

Figures 9, 9A:
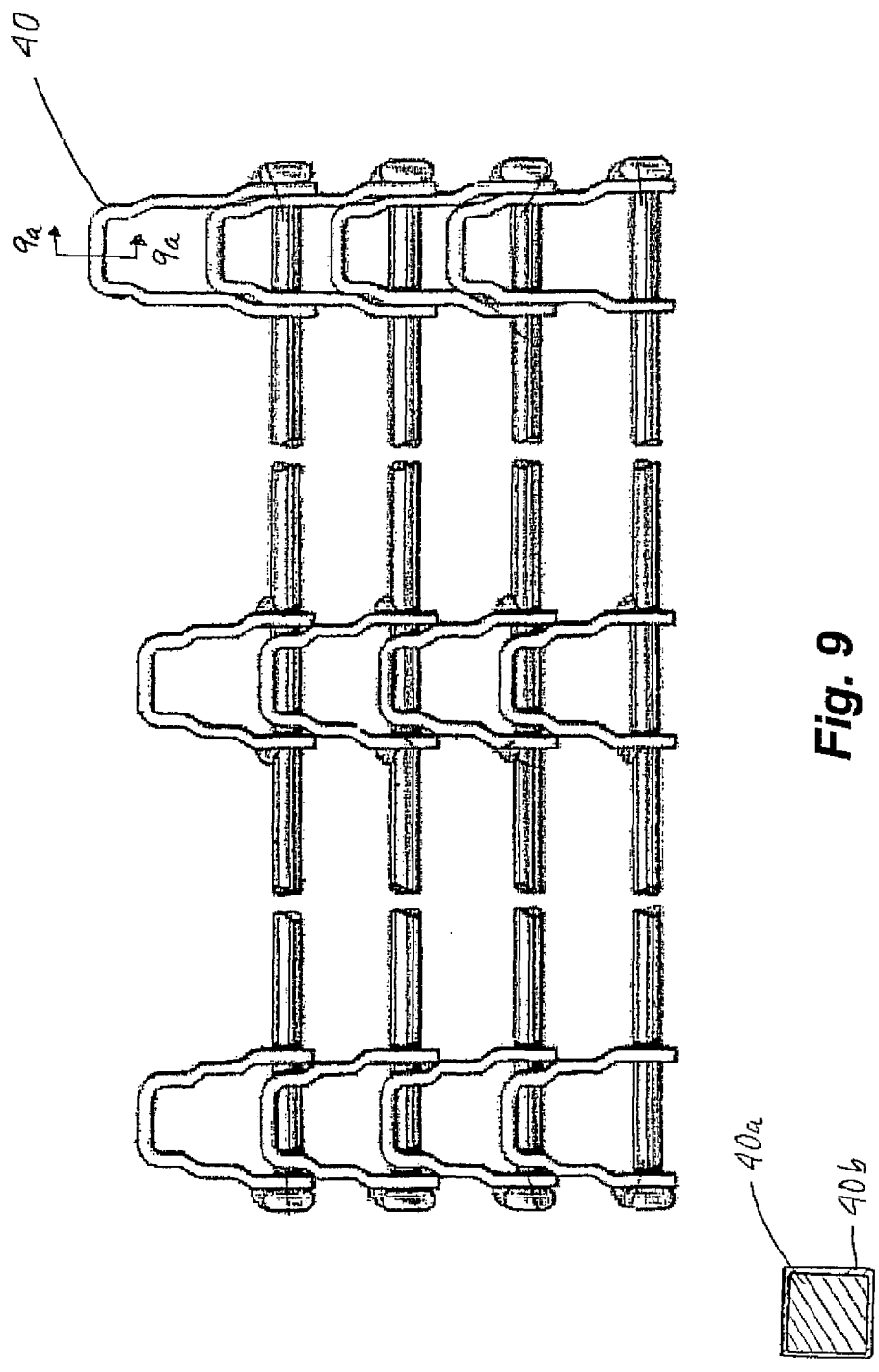
FIG. 9 is a top view of another type of conveyor that may be powder coated.
FIG. 9a is a cross-sectional view taken along line 9a-9a of FIG. 9.

Still another aspect of the invention is to provide a component for use in a conveyor belt or chain to carry or support articles or product with a powder coating to provide improved wear resistance, reduce friction, and enhance cleanability. As shown in FIG. 9, the component may comprise a link 40 with one surface for conveying articles and another surface for engaging a support structure, such as a guide rail, frame or bed. With reference to the enlarged, cross-section view of FIG. 9a, the link 40 includes a core 40a, which may be formed of any electrically conductive material capable of being powder coated, such as mild or stainless steel (e.g., 303 or 304). This core 40a is coated to create an outer film or shell 40b comprised of durable, wear and abrasion resistant polymer material.

In one particularly preferred embodiment, the shell 40b comprises nylon, and preferably Nylon 11 or Nylon 12, applied via a powder coating process to form a thin film over the entire surface of the core 40a. However, the coating for the core 40a may comprise other durable, abrasion-resistant polymer materials, with a preference for those that are hydrocarbon-based, such as polyamides, polyolefins, polyesters, polyethylenes, epoxies, acrylics, or other powder coat paints (such as PROTECH CHEMICAL LTD. Mercury Blue hybrid, SHERWIN WILLIAMS Whitewater polyester, SHERWIN WILLIAMS Antique White hybrid, and SHERWIN WILLIAMS Furniture White polyurethane). Mixtures may also be used.

Figures 10, 10A:
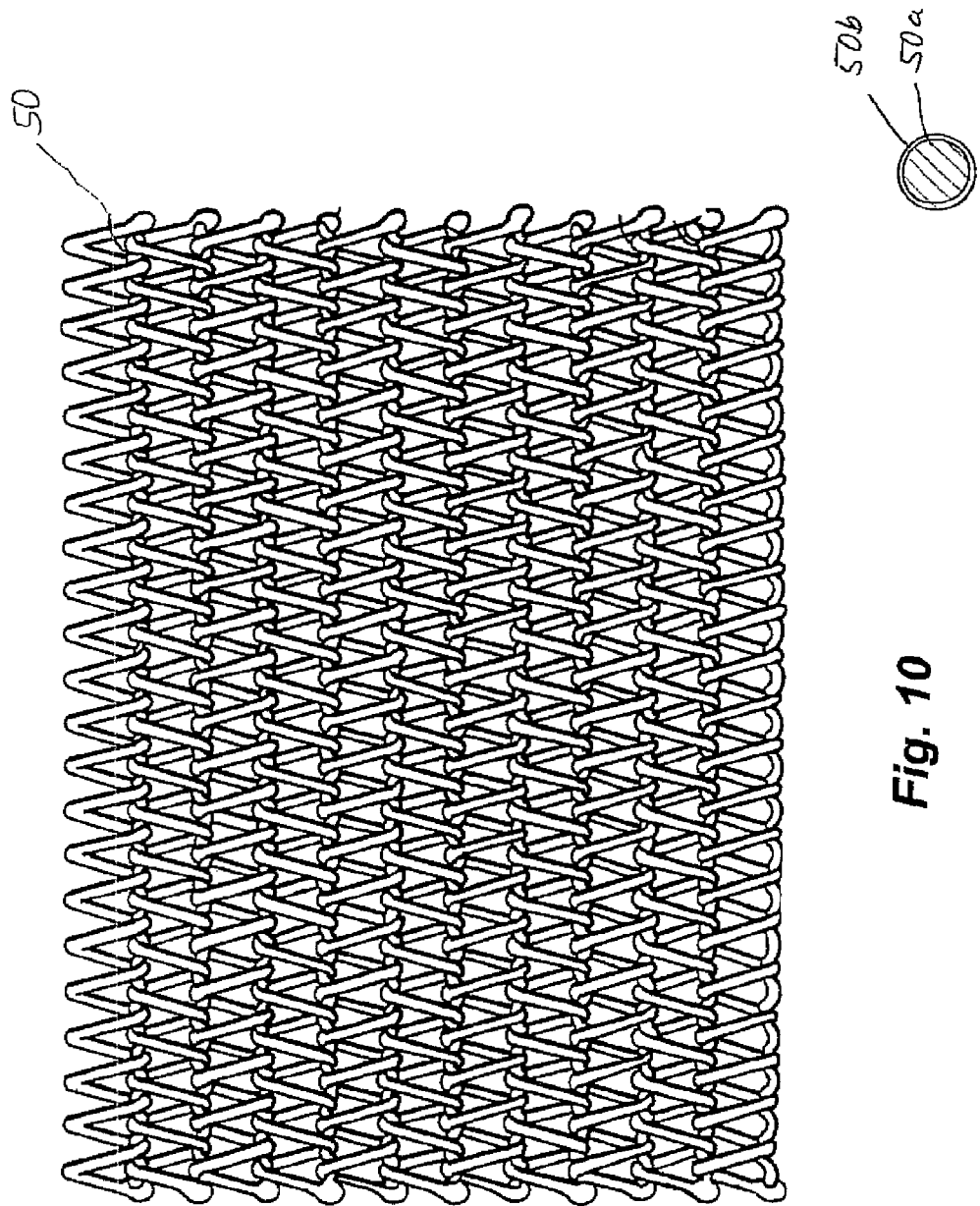
FIG. 10 is a top view of a wire mesh conveyor that is powder coated.
FIG. 10a is a cross-sectional view of the wire forming the conveyor of FIG. 10.

As shown in FIG. 10, and in accordance with another aspect of the invention, the conveyor component may comprise wire mesh 50 with one surface for conveying articles and another surface for engaging a support structure, such as a guide rail, frame, or bed (which may also be coated as described above). As perhaps best understood with reference to FIG. 10a, the mesh 50 includes a core 50a, which may be formed of any electrically conductive material capable of being powder coated, such as mild steel in wire form. This core 50a (which may be woven or non-woven) is coated to create an outer film or shell 50b comprised of durable, wear and abrasion resistant polymer material.

In one particularly preferred embodiment, the shell 50b comprises nylon, and preferably Nylon 11 or Nylon 12, applied via a powder coating process to form a thin film over the entire surface of the core 50a. However, the coating for the steel core 50a may comprise other durable, abrasion-resistant polymer materials, with a preference for hydrocarbon-based polymers, such as those comprising a polyolefin, polyamide, polyester, urethane, epoxy, acrylic, other powder coat paints (such as for example PROTECH CHEMICAL LTD. Mercury Blue hybrid, SHERWIN WILLIAMS Whitewater polyester, SHERWIN WILLIAMS Antique White hybrid, and SHERWIN WILLIAMS Furniture White polyurethane), and mixtures thereof.

Turning to FIG. 11, the conveying component may comprise a dispenser 60, such as a volumetric hopper, made of mild or stainless steel with at least one surface for conveying product. With reference to FIG. 11a, the dispenser 60 includes a plurality of plate-like sides or walls, each having a core 60a, which may be formed of any electrically conductive material capable of being powder coated, such as mild or stainless steel (e.g., 303 or 304). This core 60a is coated to create an outer film or shell 60b comprised of durable, wear and abrasion resistant polymer material.

In one particularly preferred embodiment, the shell 60b comprises nylon, and preferably Nylon 11 or Nylon 12, applied via a powder coating process to form a thin film over the entire surface of the core 60a. However, the coating for the core 60a may comprise other durable, abrasion-resistant materials, with a preference for those that are hydrocarbon-based, such as polyolefins, polyamides, polyesters, urethanes, epoxies, acrylics, or other powder coat paints (such as PROTECH CHEMICAL LTD. Mercury Blue hybrid, SHERWIN WILLIAMS Whitewater polyester, SHERWIN WILLIAMS Antique White hybrid, and SHERWIN WILLIAMS Furniture White polyurethane).

As also shown in FIG. 11, and with reference also to FIG. 12, the conveying component may comprise a chute 70 made of mild or stainless steel with one surface for conveying product. The chute 70 includes a core 70a, which may be formed of any electrically conductive material capable of being powder coated, such as mild or stainless steel (e.g., 303 or 304). This core 70a is coated to create an outer film or shell 70b comprised of durable, wear and abrasion resistant polymer material.

In one particularly preferred embodiment, the shell 70b comprises nylon, and preferably Nylon 11 or Nylon 12, applied via a powder coating process to form a thin film over the entire surface of the core 70a. However, the coating for the core 70a may comprise other durable, abrasion-resistant polymer materials, with a preference for those that are hydrocarbon-based, such as other polyamides, polyolefins, polyesters, urethanes, epoxies, acrylics, other powder coat paints (such as for example PROTECH CHEMICAL LTD. Mercury Blue hybrid, SHERWIN WILLIAMS Whitewater polyester, SHERWIN WILLIAMS Antique White hybrid, and SHERWIN WILLIAMS Furniture White polyurethane) or mixtures thereof.

Figures 13, 13A:
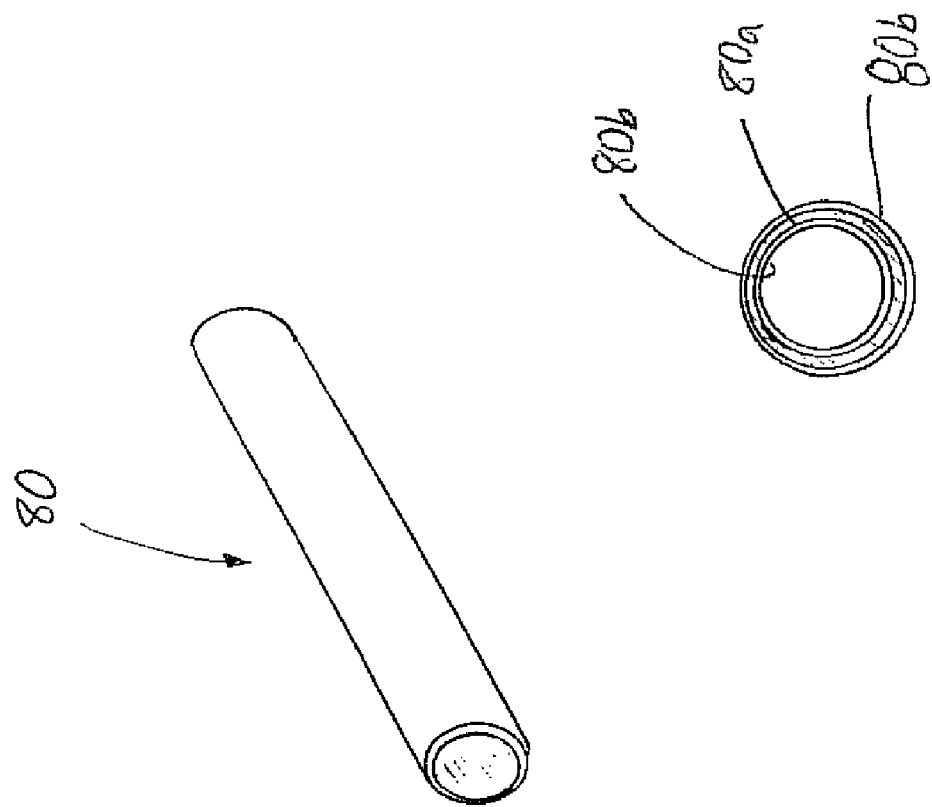

Turning to FIG. 13, the conveying component may comprise a tube or pipe 80 made of thin-walled mild or stainless steel with one surface for conveying product. The tube or pipe 80 includes a core 80a, which may be formed of any electrically conductive material capable of being powder coated, such as mild or stainless steel (e.g., 303 or 304). This core 80a is coated to create an outer film or shell 80b comprised of durable, wear and abrasion resistant polymer material on both the inside and outside surfaces.

In one particularly preferred embodiment, the shell 80b comprises nylon, and preferably Nylon 11 or Nylon 12, applied via a powder coating process to form a thin film over the entire surface of the core 80a. However, the coating for the core 80a may comprise other durable, abrasion-resistant polymer materials, with a preference for hydrocarbon-based polymers, such as other polyamides, polyolefins, urethanes, polyesters, epoxies, acrylics, or other powder coat paints (such as for example PROTECH CHEMICAL LTD. Mercury Blue hybrid (a mixture), SHERWIN WILLIAMS Whitewater polyester, SHERWIN WILLIAMS Antique White hybrid, and SHERWIN WILLIAMS Furniture White polyurethane).

Figure 14A:
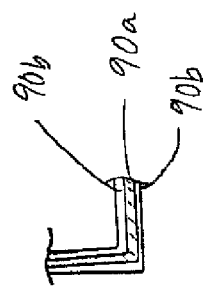
Figure 14:
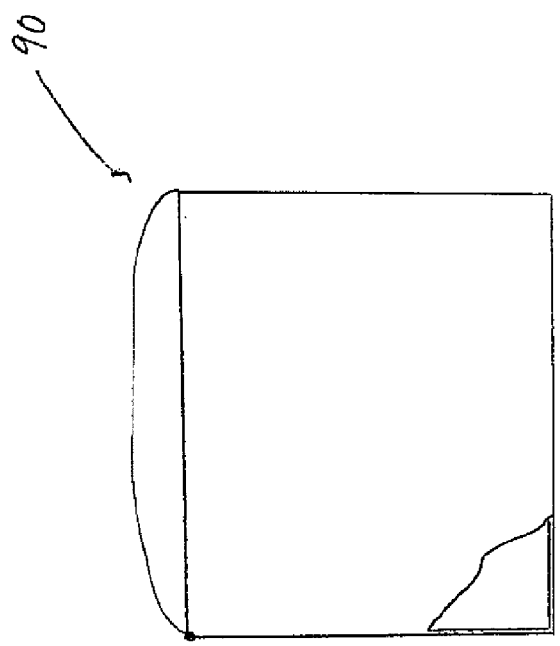
FIG. 14 is another example of a powder-coated conveyor component.

Turning to FIG. 14, the conveying component may comprise a vat or tank 90 made of thin-walled mild or stainless steel with one surface for conveying product. The vat or tank 90 includes a core 90a, which may be formed of any electrically conductive material capable of being powder coated, such as mild or stainless steel (e.g., 303 or 304). This core 90a is coated to create an outer film or shell 90b comprised of durable, wear and abrasion resistant polymer material on both the inside and outside surfaces.

In one particularly preferred embodiment, the shell 90b comprises nylon, and preferably Nylon 11 or Nylon 12, applied via a powder coating process to form a thin film over the entire surface of the core 90a. However, the coating for the core 90a may comprise other durable, abrasion-resistant polymer materials, with a preference for those that are hydrocarbon-based, other polyamides, polyolefins, urethanes, polyesters, epoxies, acrylics, or other powder coat paints (such as for example PROTECH CHEMICAL LTD. Mercury Blue hybrid, SHERWIN WILLIAMS Whitewater polyester, SHERWIN WILLIAMS Antique White hybrid, and SHERWIN WILLIAMS Furniture White polyurethane).

Figure 15:
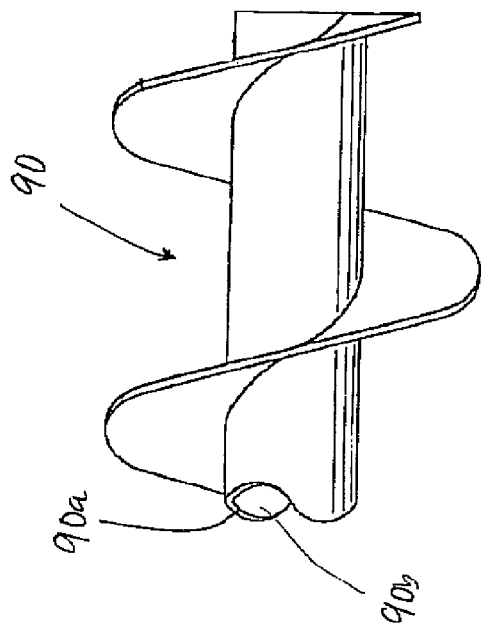
FIG. 15 is still another example of a powder-coated component.

FIG. 15 shows that the conveying component may comprise a screw of auger 100 made of thin-walled mild or stainless steel with one surface for conveying product. The screw or auger 100 includes a core 100a, which may be formed of any electrically conductive material capable of being powder coated, such as mild or stainless steel (e.g., 303 or 304). This core 100a is coated to create an outer film or shell 100b comprised of durable, wear and abrasion resistant polymer material on both the inside and outside surfaces.

In one particularly preferred embodiment, the shell 100b comprises nylon, and preferably Nylon 11 or Nylon 12, applied via a powder coating process to form a thin film over the entire surface of the core 100a. The coating for the core 100a may comprise other durable, abrasion-resistant polymer materials, with a preference for those that are hydrocarbon-based, such as polyamides, polyolefins, urethanes, polyesters, epoxies, acrylics or other powder coat paints (such as PROTECH CHEMICAL LTD. Mercury Blue hybrid, SHERWIN WILLIAMS Whitewater polyester, SHERWIN WILLIAMS Antique White hybrid, and SHERWIN WILLIAMS Furniture White polyurethane).

Aside from being relatively easy and inexpensive to implement, these techniques result in a durable, seamless coating for the corresponding components, and one securely bonded to the surface of the core without the need for adhesives or the like (and without any appreciable gap in which food particles, debris, or the like may become trapped). Moreover, the resulting coated composite component for use in conveyor systems has numerous advantages over those presently available for such use, especially when the core is made of stainless steel. In such case, the underlying stainless steel forming the core provides an additional layer of protection against corrosion, even if the shell is compromised in use. This is especially true where a perforation or scratch arises in a non-wearing area of the component. This is because the thickness and resulting elevation of the remaining shell prevents direct contact from being made with the underlying surface of the core.

When formed of nylon, the shell is also somewhat soft and compliant, at least as compared to a metal such as stainless steel. Thus, unlike the conventional stainless steel components, for which it is believed that increased hardness is most desirable to improve wear resistance, application of the relatively soft shell may act to receive and hold any wear particles that may be generated in an embedded fashion. This capturing helps to prevent wear particles once generated from embedding in any adjacent surface and causing further deleterious wear on the component as may occur using the conventional (i.e., uncoated) arrangement.

Aside from being relatively durable and hard (75+/−5 Shore D Hardness, in the case of Nylon 12), the polymer shell also has low coefficient of friction with most commonly encountered wear materials, such as other polymers. Thus, the shell does not in any way compromise the operation or performance of the conveyor system S. Indeed, in the case where the component is a powder coated link for use with a driven conveyor, the reduced friction actually decreases the powder requirements for driving the belt or chain, which in turn decreases operating and maintenance costs (including in terms of energy consumption).

Finally, many coating materials capable of being used to form the shell including Nylon 12, are generally food grade and approved by the FDA for use with food products. Thus, providing the coating on the core made of such FDA-compatible or food grade materials to form the shell does not in any way impact the ability to be used in conveyors for food products. Moreover, the shell is believed to improve cleanability by providing a uniform, low friction surface over which cleaning fluids may freely pass and soft particles (such as from food products) do not readily adhere.

Preferably, the material associated with the core to form the shell is generally clear (transparent) or translucent (e.g., cloudy but light transmissive) once cured. As a result, the coating is generally invisible to the naked eye, and the component appears to be made entirely from steel. This essentially hides the shell and the existence of the coating from the consumer, but leaves the appearance of the underlying steel to give the assurance of a strong, durable part. An "invisible" coating also facilitates retrofitting the coated component into existing conveyor systems, since the coated and uncoated components would be visually indistinguishable. However, it is also possible to make the coating opaque, or otherwise color it to match the color of the links forming the conveyor belt (e.g., a white coating for white links).

For food based applications, it may also be desirable to incorporate a germicidal, anti-microbial, anti-bacterial, and anti-fungal agent into the coating forming the shell. Consequently, the resulting component would not only be able to resist the growth of undesirable microbes, fungi, germs or bacteria, but would also help to prevent these undesirable entities from propagating (especially in "hidden" or closed areas). Suitable types of such agents may be found in U.S. Pat. Nos. 6,180,039, 6,039,964, 5,941,369, and 5,586,643, the disclosures of which are incorporated herein by reference. Alternatively, titanium dioxide having a small particle size can be incorporated into the coating, which when bombarded with UV rays serves to attack both inorganic and organic compounds and turn them into molecules that can be harmlessly washed away using water.

The following tests demonstrate the efficacy of the proposed invention.

Manufacturing Test

A white polymer-based (DURALON 12 brand Type 12 nylon) powder coating from Thermoclad was applied to an elongated, generally cylindrical four millimeter diameter rod made of stainless steel (303) using an electrostatic gun. The rod with the powder coating was then baked in an oven at a curing temperature of about 400-425° F., for a period of about 15-20 minutes. The resulting structure had a durable, seamless shell having a thickness of about 0.003 to 0.005 inches.

Painting Test

In order to assess the potential to powder coat stainless steel using wear resistant polymer materials, a variety of different powder coat paints were tried. These included the following paint types:
1. PROTECH CHEMICAL LTD. Mercury Blue hybrid
2. SHERWIN WILLIAMS Whitewater polyester
3. SHERWIN WILLIAMS Antique White hybrid
4. THERMOCLAD White DURALON 12 Nylon 12)
5. THERMOCLAD Clear DURALON 12 (Nylon 12)
6. SHERWIN WILLIAMS Furniture White polyurethane All of these powder-coat paint types were successfully applied to the stainless steel rods and should provide adequate performance in terms of preventing the creation of the black oxide when placed in wearing contact with another part or product.

Conveyor Test

Two identical conveyors were assembled using a conveyor test bed allowing both to operate simultaneously under substantially identical conditions. One conveyor was assembled using standard stainless steel rods to interconnect the link. The other conveyor was assembled using standard stainless steel rods that had been coated with an Antique White hybrid powder coat paint produced by SHERWIN WILLIAMS. This test was designed to determine if the black oxide formation could be prevented by introducing a material between the Acetal links and the stainless steel.

After continuous operation of the test bed was started, black oxide formation was observed on the bare stainless steel rods within a few days. This black oxide formation has continued to progress throughout the bare-stainless-steel-rod chain. No black oxide formation was noted on the chain with rods coated with the hybrid powder coat paint for 7½ weeks with only brief (less than one hour) interruptions to observe the progress.

Coefficient of Friction Determination

The coefficient of friction between acetal and stainless steel is approximately 0.2. When stainless steel is coated with nylon, the coefficient of friction is approximately 0.12. This represents a 40% decrease in the coefficient of friction. When considered in connection with the hundreds or thousands of wear surfaces between first and second parts that are present in the average wire mesh or conveyor belt (chain), a considerable reduction in friction results, which in turn reduces the amount of powder required to drive the conveyor along an endless path.

Accelerated Abrasion Test

In order to test aggressively the abrasion resistance of the powder coating, rods were mounted in a holder, immersed in a sand/water slurry bath, and the assembly rotated continuously. This results in rapid wear of the rods. As described below, a total of three different tests have been conducted.

In the first test four different powder coat materials applied to a stainless steel rod were tested along with a bare stainless steel control rod. The four materials were:
1. SHERWIN WILLIAMS Whitewater polyester paint
2. SHERWIN WILLIAMS Antique White hybrid paint
3. THERMOCLAD White DURALON 12 (Nylon 12)
4. SHERWIN WILLIAMS Furniture White polyurethane paint After less than 2 hours of operation, the polyester, hybrid, and polyurethane paints had all been worn through to the underlying stainless steel. The Nylon 12 and the bare stainless steel rods showed substantially less wear. FIG. 16 shows a summary of the total wear on each of the six rods that were tested.

The second test was a direct comparison of the Nylon 12 coating and the bare stainless steel. A total of approximately eight hours of testing resulted in the stainless steel rods and the Nylon 12 coated rods showing essentially identical wear rates. FIG. 17 shows a summary of the total wear on each of the six rods that were tested.

A third test was conducted to evaluate white DURALON 12 applied by Electrostatic Technology, Inc. of Branford, Conn., clear DURALON 12 applied using an electrostatic gun, and bare stainless steel. This test was conducted for a total of approximately seven hours.

Again, the stainless steel rods and two (DURALON 12 (2) and clear (1)) of the Nylon 12 coated rods showed essentially identical wear rates. The remaining two Nylon 12 coated rods (DURALON 12 (1) and clear (2)) were worn through to the metal and had the coating peeled back. As a result, the wear measurements for these two test pieces show that they had more wear than would occur during normal use over a significant period. It seems likely that the peeling away is simply the extension of the failure process. FIG. 18 summarizes the total wear on each of the six rods tested.

Oscillating Wear Test

In order to test the ability of various types of powder-coat materials to resist abrasion wear an oscillating-wear test machine was set up. This machine is designed to test a variety of different ways that the rods may move relative to the Acetal links.

Three different powder coat materials or paints were placed into the machine to test along with a standard stainless steel rods. The three paints were:
1. SHERWIN WILLIAMS Whitewater polyester
2. SHERWIN WILLIAMS Antique White hybrid
3. THERMOCLAD White DURALON 12 (Nylon 12)

A review of the condition of the rods and the links in the test machine approximately one month after the test began revealed no visually apparent wear on any of the coated rods. A subsequent inspection a week later showed that the bare stainless steel rods were beginning to show the presence of black oxide while all of the coated rods showed no black oxide. Thus, all three of the tested paints appear to prevent the formation of the black oxide. Additionally, they have at least initially adequate resistance to wear.

The foregoing description of various embodiments of the present invention are presented for purposes of illustration and description. This illustration and description is not intended to be exhaustive or to limit the invention to the precise forms disclosed. Obvious modifications or variations are possible in light of the above teachings. For instance, although a preference exists for coating the entire core to form the component, it is possible to provide the coating strategically to cover only areas of contact (and thus wear) with the articles being conveyed. Likewise, the coating need not be applied in any notches, recesses, or indentations in the component that will not be exposed in use. Moreover, although the coating is mentioned as being applied to various specific types of components, it should be appreciated that it could be applied to any type of conveyor component, including a support (pylon 178 or otherwise; see FIG. 1), guide rail, side rail, bracket (e.g., elongated bracket 180 in FIG. 1), foot (e.g., ground support 182 in FIG. 1), shoe, slat, underguard (e.g., pan 184), sprocket (idler or drive sprocket 186), roller, housing (e.g., motor cover 188 in FIG. 1), clamp (e.g., connector 190 in FIG. 1), or the like, regardless of the form plate, rod, bar, etc.). Materials besides metals may be sufficiently electrically conductive for purposes of being powder coated, such as, for example, polycarbonate. Before powder coating, the material may be cleaned using an alkali solution followed by a phosphate solution. The cleaning is intended to remove all dirt, grease, debris, etc., that may be present on the surfaces. The embodiments described provide the best illustration of the principles of the invention and its practical applications to thereby enable one of ordinary skill in the art to utilize the invention in various embodiments and with various modifications suited to the particular use contemplated. All such modifications and variations are within the scope of the invention.

What is claimed is:

1. In a conveying system for supporting or conveying product with improved wear resistance, enhanced cleanability, and reduced surface friction, a conveyor component comprising an electrically conductive substrate having a surface coated with a shell comprising a generally clear or translucent powder coating formed of a polymer selected from the group consisting of a polyamide, polyolefin, polyester, urethane, epoxy, acrylic, and mixtures thereof, whereby the shell is essentially invisible to the naked eye.

2. The apparatus of claim 1, wherein the substrate comprises metal.

3. The apparatus of claim 1, wherein the polymer powder coating comprises a polyamide.

4. The apparatus of claim 1, wherein the substrate comprises stainless steel and the polymer powder coating comprises nylon.

5. The apparatus of claim 1, wherein the substrate comprises a plate.

6. The apparatus of claim 1, wherein the substrate comprises a link.

7. The apparatus of claim 1, wherein the substrate comprises a bar.

8. The apparatus of claim 1, wherein the substrate comprises wire mesh.

9. The apparatus of claim 1, wherein the substrate comprises a rod.

10. In a conveyor system for temporarily supporting or conveying product, the improvement comprising a steel component for supporting the product being conveyed, said steel component having a powder coating formed of a polymer creating a shell on a surface of the component, wherein the polymer is selected from the group consisting of a polyamide, a polyolefin, a polyester, a urethane, an epoxy, an acrylic, and mixtures thereof.

11. The component of claim 10, wherein the shell comprises a polyamide.

12. The component of claim 11, wherein the shell comprises nylon.

13. The component of claim 10, wherein the shell is generally clear.

14. The component of claim 10, wherein the shell is opaque.

15. The component of claim 10, wherein the shell includes an anti-microbial, anti-bacterial, anti-fungal, or germicidal agent.

16. The component of claim 10, wherein the shell has a thickness of about 0.003 to 0.005 inches.

17. The component of claim 10, wherein the component comprises stainless steel.

18. A conveyor system, comprising:
   a plurality of interconnected links forming a chain for conveying product; and
   a support for supporting the chain;
   wherein one of the links or the support comprises an electrically conductive core having a surface powder coated with a polymer to form an outer shell.

19. The system according to claim 18, wherein the links are interconnected by connectors.

20. The system according to claim 19, wherein at least one of the connectors comprises an electrically conductive core having a surface powder coated with a polymer to form an outer shell.

21. A conveyor system, comprising:
   a plurality of links; and
   at least one connector for interconnecting the links;
   wherein at least one of the links comprises an electrically conductive core having a surface powder coated with a polymer to form an outer shell.

22. A method of improving wear resistance, enhancing cleanability, and reducing surface friction in a conveyor system, comprising:
   powder coating a steel component with a polymer selected from the group consisting of a polyamide, polyolefin, polyester, urethane, epoxy, acrylic, and mixtures thereof; and
   providing the powder coated steel component in the conveyor system to convey product.

23. The method of claim 22, wherein the powder coating step comprises:
   at least partially coating the steel component with the polymer powder; and
   heating the coating to form a protective shell on a surface of the component.

24. The method of claim 22, wherein the coating step comprises electrostatically applying nylon powder to a surface of the steel component and then heating the component to cure the powder and form the shell.

* * * * *